United States Patent
Bachar et al.

(10) Patent No.: US 12,298,590 B2
(45) Date of Patent: *May 13, 2025

(54) LINEAR BALL GUIDED VOICE COIL MOTOR FOR FOLDED OPTIC

(71) Applicant: Corephotonics Ltd., Tel Aviv (IL)

(72) Inventors: Gil Bachar, Tel Aviv (IL); Itay Yedid, Tel Aviv (IL); Gal Shabtay, Tel Aviv (IL); Ephraim Goldenberg, Tel Aviv (IL); Gal Avivi, Tel Aviv (IL); Itay Jerby, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/888,195

(22) Filed: Sep. 18, 2024

(65) Prior Publication Data

US 2025/0013004 A1 Jan. 9, 2025

Related U.S. Application Data

(63) Continuation of application No. 18/626,499, filed on Apr. 4, 2024, now Pat. No. 12,124,106, which is a
(Continued)

(51) Int. Cl.
*G02B 7/09* (2021.01)
*G02B 27/64* (2006.01)
(Continued)

(52) U.S. Cl.
CPC .............. *G02B 7/09* (2013.01); *G02B 27/646* (2013.01); *H04N 23/54* (2023.01); *H04N 23/55* (2023.01)

(58) Field of Classification Search
CPC ...... G02B 7/09; G02B 27/646; H04N 5/2253; H04N 5/2254
See application file for complete search history.

(56) References Cited

U.S. PATENT DOCUMENTS 3,085,354 A   4/1963   Rasmussen et al.
3,584,513 A   6/1971   Gates
(Continued)

FOREIGN PATENT DOCUMENTS

CN   101276415 A   10/2008
CN   201514511 U   6/2010
(Continued)

OTHER PUBLICATIONS

Statistical Modeling and Performance Characterization of a Real-Time Dual Camera Surveillance System, Greienhagen et al., Publisher: IEEE, 2000, 8 pages.
(Continued)

*Primary Examiner* — Zoheb S Imtiaz
(74) *Attorney, Agent, or Firm* — Nathan & Associates; Menachem Nathan

(57) ABSTRACT

Actuators for carrying and actuating a lens having a first optical axis, the lens receiving light folded from a second optical axis substantially perpendicular to the first optical axis, comprising first and second VCM engines coupled to the lens and first and second linear ball-guided rails operative to create movement of the lens in two substantially orthogonal directions upon actuation by respective VCM engines.

20 Claims, 11 Drawing Sheets

Related U.S. Application Data continuation of application No. 18/077,367, filed on Dec. 8, 2022, now Pat. No. 11,977,270, which is a continuation of application No. 17/224,494, filed on Apr. 7, 2021, now Pat. No. 11,550,119, which is a continuation of application No. 16/863,239, filed on Apr. 30, 2020, now Pat. No. 11,048,060, which is a continuation of application No. 15/738,951, filed as application No. PCT/IB2017/054088 on Jul. 6, 2017, now Pat. No. 10,845,565.

(60) Provisional application No. 62/359,222, filed on Jul. 7, 2016.

(51) Int. Cl.
*H04N 23/54* (2023.01)
*H04N 23/55* (2023.01)

(56) References Cited

U.S. PATENT DOCUMENTS

| | | |
|---|---|---|
| 3,941,001 A | 3/1976 | LaSarge |
| 4,199,785 A | 4/1980 | Mccullough et al. |
| 4,792,822 A | 12/1988 | Akiyama et al. |
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,331,465 A | 7/1994 | Miyano |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,502,537 A | 3/1996 | Utagawa |
| 5,657,402 A | 8/1997 | Bender et al. |
| 5,682,198 A | 10/1997 | Katayama et al. |
| 5,768,443 A | 6/1998 | Michael et al. |
| 5,892,855 A | 4/1999 | Kakinami et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,201,533 B1 | 3/2001 | Rosenberg et al. |
| 6,208,765 B1 | 3/2001 | Bergen |
| 6,211,668 B1 | 4/2001 | Duesler et al. |
| 6,215,299 B1 | 4/2001 | Reynolds et al. |
| 6,222,359 B1 | 4/2001 | Duesler et al. |
| 6,268,611 B1 | 7/2001 | Pettersson et al. |
| 6,320,610 B1 | 11/2001 | Van Gant et al. |
| 6,341,901 B1 | 1/2002 | Iwasa et al. |
| 6,520,643 B1 | 2/2003 | Holman et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,752,969 B1 | 6/2014 | Kane et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,304,305 B1 | 4/2016 | Paul et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,426,450 B1 * | 8/2016 | Zhang ............... G03B 13/32 |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0054214 A1 | 5/2002 | Yoshikawa |
| 2002/0063711 A1 | 5/2002 | Park et al. |
| 2002/0075258 A1 | 6/2002 | Park et al. |
| 2002/0122113 A1 | 9/2002 | Foote |
| 2002/0136554 A1 | 9/2002 | Nomura et al. |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0156751 A1 | 8/2003 | Lee et al. |

(56) References Cited

U.S. PATENT DOCUMENTS

| | | |
|---|---|---|
| 2003/0160886 A1 | 8/2003 | Misawa et al. |
| 2003/0162564 A1 | 8/2003 | Kimura et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0169772 A1 | 9/2004 | Matsui et al. |
| 2004/0189849 A1 | 9/2004 | Hofer et al. |
| 2004/0227838 A1 | 11/2004 | Atarashi et al. |
| 2004/0239313 A1 | 12/2004 | Godkin |
| 2004/0240052 A1 | 12/2004 | Minefuji et al. |
| 2005/0013509 A1 | 1/2005 | Samadani |
| 2005/0046740 A1 | 3/2005 | Davis |
| 2005/0134697 A1 | 6/2005 | Mikkonen et al. |
| 2005/0141390 A1 | 6/2005 | Lee et al. |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2005/0248667 A1 | 11/2005 | Schweng et al. |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0126737 A1 | 6/2006 | Boice et al. |
| 2006/0170793 A1 | 8/2006 | Pasquarette et al. |
| 2006/0175549 A1 | 8/2006 | Miller et al. |
| 2006/0181619 A1 | 8/2006 | Liow et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0035631 A1 | 2/2007 | Ueda |
| 2007/0077057 A1 | 4/2007 | Chang |
| 2007/0114990 A1 | 5/2007 | Godkin |
| 2007/0126911 A1 | 6/2007 | Nanjo |
| 2007/0127040 A1 | 6/2007 | Davidovici |
| 2007/0159344 A1 | 7/2007 | Kisacanin |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0088942 A1 | 4/2008 | Seo |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0102948 A1 | 4/2009 | Scherling |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0168135 A1 | 7/2009 | Yu et al. |
| 2009/0190909 A1 | 7/2009 | Mise et al. |
| 2009/0200451 A1 | 8/2009 | Conners |
| 2009/0219547 A1 | 9/2009 | Kauhanen et al. |
| 2009/0234542 A1 | 9/2009 | Orlewski |
| 2009/0252484 A1 | 10/2009 | Hasuda et al. |
| 2009/0295949 A1 | 12/2009 | Ojala |
| 2009/0295986 A1 | 12/2009 | Topliss et al. |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0134621 A1 | 6/2010 | Namkoong et al. |
| 2010/0165131 A1 | 7/2010 | Makimoto et al. |
| 2010/0196001 A1 | 8/2010 | Ryynänen et al. |
| 2010/0202068 A1 | 8/2010 | Ito |
| 2010/0238327 A1 | 9/2010 | Griffith et al. |
| 2010/0246024 A1 | 9/2010 | Aoki et al. |
| 2010/0259836 A1 | 10/2010 | Kang et al. |
| 2010/0265331 A1 | 10/2010 | Tanaka |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0121666 A1 | 5/2011 | Park et al. |
| 2011/0128288 A1 | 6/2011 | Petrou et al. |
| 2011/0164172 A1 | 7/2011 | Shintani et al. |
| 2011/0221599 A1 | 9/2011 | Högasten |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0285714 A1 | 11/2011 | Swic et al. |
| 2011/0298966 A1 | 12/2011 | Kirschstein et al. |
| 2011/0310219 A1 | 12/2011 | Kim et al. |
| 2012/0014682 A1 | 1/2012 | David et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0098927 A1 | 4/2012 | Sablak et al. |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0148215 A1 | 6/2013 | Mori et al. |
| 2013/0148854 A1 | 6/2013 | Wang et al. |
| 2013/0155176 A1 | 6/2013 | Paripally et al. |
| 2013/0163085 A1 | 6/2013 | Lim et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0229544 A1 | 9/2013 | Bando |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0258048 A1 | 10/2013 | Wang et al. |
| 2013/0270419 A1 | 10/2013 | Singh et al. |
| 2013/0278785 A1 | 10/2013 | Nomura et al. |
| 2013/0286221 A1 | 10/2013 | Shechtman et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |

(56) References Cited

U.S. PATENT DOCUMENTS

| | | | |
|---|---|---|---|
| 2014/0160311 A1 | 6/2014 | Hwang et al. | |
| 2014/0192224 A1 | 7/2014 | Laroia | |
| 2014/0192238 A1 | 7/2014 | Attar et al. | |
| 2014/0192253 A1 | 7/2014 | Laroia | |
| 2014/0218587 A1 | 8/2014 | Shah | |
| 2014/0313316 A1 | 10/2014 | Olsson et al. | |
| 2014/0362242 A1 | 12/2014 | Takizawa | |
| 2014/0376090 A1 | 12/2014 | Terajima | |
| 2014/0379103 A1 | 12/2014 | Ishikawa et al. | |
| 2015/0002683 A1 | 1/2015 | Hu et al. | |
| 2015/0002684 A1 | 1/2015 | Kuchiki | |
| 2015/0042870 A1 | 2/2015 | Chan et al. | |
| 2015/0070781 A1 | 3/2015 | Cheng et al. | |
| 2015/0086127 A1 | 3/2015 | Camilus et al. | |
| 2015/0092066 A1 | 4/2015 | Geiss et al. | |
| 2015/0103147 A1 | 4/2015 | Ho et al. | |
| 2015/0110345 A1 | 4/2015 | Weichselbaum | |
| 2015/0124059 A1 | 5/2015 | Georgiev et al. | |
| 2015/0138381 A1 | 5/2015 | Ahn | |
| 2015/0145965 A1 | 5/2015 | Livyatan et al. | |
| 2015/0154776 A1 | 6/2015 | Zhang et al. | |
| 2015/0162048 A1 | 6/2015 | Hirata et al. | |
| 2015/0181115 A1 | 6/2015 | Mashiah | |
| 2015/0195458 A1 | 7/2015 | Nakayama et al. | |
| 2015/0198464 A1 | 7/2015 | El Alami | |
| 2015/0215516 A1 | 7/2015 | Dolgin | |
| 2015/0237280 A1 | 8/2015 | Choi et al. | |
| 2015/0242994 A1 | 8/2015 | Shen | |
| 2015/0244906 A1 | 8/2015 | Wu et al. | |
| 2015/0253543 A1 | 9/2015 | Mercado | |
| 2015/0253647 A1 | 9/2015 | Mercado | |
| 2015/0261299 A1 | 9/2015 | Wajs | |
| 2015/0271471 A1 | 9/2015 | Hsieh et al. | |
| 2015/0281678 A1 | 10/2015 | Park et al. | |
| 2015/0286033 A1 | 10/2015 | Osborne | |
| 2015/0288865 A1 | 10/2015 | Osborne | |
| 2015/0296112 A1 | 10/2015 | Park et al. | |
| 2015/0316744 A1 | 11/2015 | Chen | |
| 2015/0334309 A1 | 11/2015 | Peng et al. | |
| 2015/0346587 A1* | 12/2015 | Lim | G03B 17/02 348/373 |
| 2016/0028949 A1 | 1/2016 | Lee et al. | |
| 2016/0044250 A1 | 2/2016 | Shabtay et al. | |
| 2016/0070088 A1 | 3/2016 | Koguchi | |
| 2016/0154066 A1 | 6/2016 | Hioka et al. | |
| 2016/0154202 A1 | 6/2016 | Wippermann et al. | |
| 2016/0154204 A1 | 6/2016 | Lim et al. | |
| 2016/0212358 A1 | 7/2016 | Shikata | |
| 2016/0212418 A1 | 7/2016 | Demirdjian et al. | |
| 2016/0219222 A1* | 7/2016 | Heo | H04N 23/55 |
| 2016/0238834 A1 | 8/2016 | Erlich et al. | |
| 2016/0241751 A1 | 8/2016 | Park | |
| 2016/0245669 A1 | 8/2016 | Nomura | |
| 2016/0291295 A1 | 10/2016 | Shabtay et al. | |
| 2016/0295112 A1 | 10/2016 | Georgiev et al. | |
| 2016/0301840 A1 | 10/2016 | Du et al. | |
| 2016/0301868 A1 | 10/2016 | Acharya et al. | |
| 2016/0342095 A1 | 11/2016 | Bieling et al. | |
| 2016/0353008 A1* | 12/2016 | Osborne | G03B 13/36 |
| 2016/0353012 A1 | 12/2016 | Kao et al. | |
| 2016/0381289 A1 | 12/2016 | Kim et al. | |
| 2017/0001577 A1 | 1/2017 | Seagraves et al. | |
| 2017/0019616 A1 | 1/2017 | Zhu et al. | |
| 2017/0070731 A1 | 3/2017 | Darling et al. | |
| 2017/0094187 A1 | 3/2017 | Sharma et al. | |
| 2017/0115466 A1 | 4/2017 | Murakami et al. | |
| 2017/0124987 A1 | 5/2017 | Kim et al. | |
| 2017/0150061 A1 | 5/2017 | Shabtay et al. | |
| 2017/0176711 A1 | 6/2017 | Iwasaki et al. | |
| 2017/0187962 A1 | 6/2017 | Lee et al. | |
| 2017/0214846 A1 | 7/2017 | Du et al. | |
| 2017/0214866 A1 | 7/2017 | Zhu et al. | |
| 2017/0219749 A1 | 8/2017 | Hou et al. | |
| 2017/0230552 A1 | 8/2017 | Eromaki et al. | |
| 2017/0235094 A1* | 8/2017 | Osaka | H02K 41/0356 359/824 |
| 2017/0242225 A1 | 8/2017 | Fiske | |
| 2017/0276954 A1 | 9/2017 | Bajorins et al. | |
| 2017/0289458 A1 | 10/2017 | Song et al. | |
| 2017/0294002 A1 | 10/2017 | Jia et al. | |
| 2017/0329111 A1 | 11/2017 | Hu et al. | |
| 2018/0003925 A1 | 1/2018 | Shmunk | |
| 2018/0013944 A1 | 1/2018 | Evans, V et al. | |
| 2018/0017844 A1 | 1/2018 | Yu et al. | |
| 2018/0024329 A1 | 1/2018 | Goldenberg et al. | |
| 2018/0059379 A1 | 3/2018 | Chou | |
| 2018/0109660 A1 | 4/2018 | Yoon et al. | |
| 2018/0109710 A1 | 4/2018 | Lee et al. | |
| 2018/0120674 A1 | 5/2018 | Avivi et al. | |
| 2018/0150973 A1 | 5/2018 | Tang et al. | |
| 2018/0176426 A1 | 6/2018 | Wei et al. | |
| 2018/0183982 A1 | 6/2018 | Lee et al. | |
| 2018/0184010 A1 | 6/2018 | Cohen et al. | |
| 2018/0198897 A1 | 7/2018 | Tang et al. | |
| 2018/0216925 A1 | 8/2018 | Yasuda et al. | |
| 2018/0241922 A1 | 8/2018 | Baldwin et al. | |
| 2018/0249090 A1 | 8/2018 | Nakagawa et al. | |
| 2018/0295292 A1 | 10/2018 | Lee et al. | |
| 2018/0300901 A1 | 10/2018 | Wakai et al. | |
| 2018/0307005 A1 | 10/2018 | Price et al. | |
| 2018/0329281 A1 | 11/2018 | Ye | |
| 2018/0368656 A1 | 12/2018 | Austin et al. | |
| 2019/0089941 A1 | 3/2019 | Bigioi et al. | |
| 2019/0096047 A1 | 3/2019 | Ogasawara | |
| 2019/0100156 A1 | 4/2019 | Chung et al. | |
| 2019/0121103 A1 | 4/2019 | Bachar et al. | |
| 2019/0121216 A1 | 4/2019 | Shabtay et al. | |
| 2019/0130822 A1 | 5/2019 | Jung et al. | |
| 2019/0141248 A1* | 5/2019 | Hubert | H05K 1/189 |
| 2019/0154466 A1 | 5/2019 | Fletcher | |
| 2019/0213712 A1 | 7/2019 | Lashdan et al. | |
| 2019/0215440 A1 | 7/2019 | Rivard et al. | |
| 2019/0222758 A1 | 7/2019 | Goldenberg et al. | |
| 2019/0227338 A1 | 7/2019 | Bachar et al. | |
| 2019/0228562 A1 | 7/2019 | Song | |
| 2019/0297238 A1 | 9/2019 | Klosterman | |
| 2019/0320119 A1 | 10/2019 | Miyoshi | |
| 2020/0014912 A1 | 1/2020 | Kytsun et al. | |
| 2020/0092486 A1 | 3/2020 | Guo et al. | |
| 2020/0103726 A1 | 4/2020 | Shabtay et al. | |
| 2020/0104034 A1 | 4/2020 | Lee et al. | |
| 2020/0118287 A1 | 4/2020 | Hsieh et al. | |
| 2020/0134848 A1 | 4/2020 | El-Khamy et al. | |
| 2020/0162682 A1 | 5/2020 | Cheng et al. | |
| 2020/0220956 A1 | 7/2020 | Fujisaki et al. | |
| 2020/0221026 A1 | 7/2020 | Fridman et al. | |
| 2020/0264403 A1 | 8/2020 | Bachar et al. | |
| 2020/0314224 A1 | 10/2020 | Yang | |
| 2020/0389580 A1 | 12/2020 | Kodama et al. | |
| 2021/0180989 A1 | 6/2021 | Fukumura et al. | |
| 2021/0208415 A1 | 7/2021 | Goldenberg et al. | |
| 2021/0333521 A9 | 10/2021 | Yedid et al. | |
| 2021/0368104 A1 | 11/2021 | Bian et al. | |
| 2022/0146910 A1 | 5/2022 | Li et al. | |
| 2022/0252963 A1 | 8/2022 | Shabtay et al. | |
| 2022/0368814 A1 | 11/2022 | Topliss et al. | |
| 2023/0022701 A1 | 1/2023 | Li et al. | |

FOREIGN PATENT DOCUMENTS

| | | |
|---|---|---|
| CN | 102130567 A | 7/2011 |
| CN | 102215373 A | 10/2011 |
| CN | 102739949 A | 10/2012 |
| CN | 102982518 A | 3/2013 |
| CN | 103024272 A | 4/2013 |
| CN | 203406908 U | 1/2014 |
| CN | 203482298 U | 3/2014 |
| CN | 103841404 A | 6/2014 |
| CN | 204422947 U | 6/2015 |
| CN | 205301703 U | 6/2016 |
| CN | 105827903 A | 8/2016 |
| CN | 105847662 A | 8/2016 |
| CN | 105872325 A | 8/2016 |

(56) References Cited

FOREIGN PATENT DOCUMENTS

| | | |
|---|---|---|
| CN | 107608052 A | 1/2018 |
| CN | 107682489 A | 2/2018 |
| CN | 109729266 A | 5/2019 |
| CN | 111988454 A | 11/2020 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2003304024 A | 10/2003 |
| JP | 2004056779 A | 2/2004 |
| JP | 2004133054 A | 4/2004 |
| JP | 2004245982 A | 9/2004 |
| JP | 2005099265 A | 4/2005 |
| JP | 2005122084 A | 5/2005 |
| JP | 2005321592 A | 11/2005 |
| JP | 2006038891 A | 2/2006 |
| JP | 2006191411 A | 7/2006 |
| JP | 2006237914 A | 9/2006 |
| JP | 2006238325 A | 9/2006 |
| JP | 2008083377 A | 9/2006 |
| JP | 2007086808 A | 4/2007 |
| JP | 2007228006 A | 9/2007 |
| JP | 2007306282 A | 11/2007 |
| JP | 2008076485 A | 4/2008 |
| JP | 2008245142 A | 10/2008 |
| JP | 2008271026 A | 11/2008 |
| JP | 2010204341 A | 9/2010 |
| JP | 2011055246 A | 3/2011 |
| JP | 2011085666 A | 4/2011 |
| JP | 2011138407 A | 7/2011 |
| JP | 2011203283 A | 10/2011 |
| JP | 2012132739 A | 7/2012 |
| JP | 2013101213 A | 5/2013 |
| JP | 2013106289 A | 5/2013 |
| JP | 2016105577 A | 6/2016 |
| JP | 2017146440 A | 8/2017 |
| JP | 2018022123 A | 2/2018 |
| JP | 2019126179 A | 7/2019 |
| KR | 20070005946 A | 1/2007 |
| KR | 20090058229 A | 6/2009 |
| KR | 20100008936 A | 1/2010 |
| KR | 20110080590 A | 7/2011 |
| KR | 20110082494 A | 7/2011 |
| KR | 20130104764 A | 9/2013 |
| KR | 1020130135805 A | 11/2013 |
| KR | 20140014787 A | 2/2014 |
| KR | 101428042 B1 | 8/2014 |
| KR | 101477178 B1 | 12/2014 |
| KR | 20140144126 A | 12/2014 |
| KR | 101518826 B1 | 5/2015 |
| KR | 20150118012 A | 10/2015 |
| KR | 20170105236 A | 9/2017 |
| KR | 20180120894 A | 11/2018 |
| KR | 20130085116 A | 6/2019 |
| TW | I407177 B | 9/2013 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

A 3MPixel Multi-Aperture Image Sensor with 0.7 μm Pixels in 0.11 μm CMOS, Fife et al., Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 2007, 9 pages.
Superimposed multi-resolution imaging, Carles et al., Publisher: Optical Society of America, 2017, 13 pages.
Viewfinder Alignment, Adams et al., Publisher: EUROGRAPHICS, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.
Zitova Bet Al: "Image Registration Methods: A Survey", Image and Vision Computing, Elsevier, Guildford, GB, vol. 21, No. 11, Oct. 1, 2003 (Oct. 1, 2003), pp. 977-1000, XP00i 189327, ISSN: 0262-8856, DOI: i0_i0i6/ S0262-8856(03)00137-9.
Itay Yedid: "The Evolution of Zoom Camera Technologies in Smartphones", Corephotonics White Paper, Aug. 1, 2017 (Aug. 1, 2017), XP055980796.
George B Arfken: "Mathematical Methods for Physicists: A Comprehensive Guide" In: "Mathematical Methods for Physicists: A Comprehensive Guide", Jan. 1, 2013 (Jan. 1, 2013), Elsevier, XP093159030, ISBN: 978-0-12-384654-9 pp. 195-196.
Office Action in related KR patent application No. 2024-7011732, dated Nov. 25, 2024.

\* cited by examiner

LINEAR BALL GUIDED VOICE COIL MOTOR FOR FOLDED OPTIC

CROSS REFERENCE TO RELATED APPLICATIONS

This application is a continuation from U.S. patent application Ser. No. 18/626,499 filed Apr. 4, 2024 (now allowed), which was a continuation from U.S. patent application Ser. No. 18/077,367 filed Dec. 8, 2022 (issued as U.S. Pat. No. 11,977,720), which was a continuation from U.S. patent application Ser. No. 17/224,494 filed Apr. 7, 2021 (issued as U.S. Pat. No. 11,550,119), which was a continuation from U.S. patent application Ser. No. 16/863,239 filed Apr. 30, 2020 (issued as U.S. Pat. No. 11,048,060), which was a continuation from U.S. patent application Ser. No. 15/738,951 filed Dec. 21, 2017 (issued as U.S. Pat. No. 10,845,565), which was a 371 application from international patent application PCT/IB2017/054088 filed Jul. 6, 2017, and is related to and claims priority from U.S. Provisional Patent Application No. 62/359,222, filed Jul. 7, 2016, which is incorporated herein by reference in its entirety.

FIELD

Embodiments disclosed herein relate in general to actuating mechanisms ("actuators") and in particular to voice coil motor (VCM) actuators for digital cameras.

BACKGROUND

High-end digital camera modules, and specifically cellphone (e.g. smartphone) digital cameras include mechanisms that enable advanced optical function such as focus or optical image stabilization (OIS). Such mechanisms may actuate (e.g. displace, shift or tilt) an optical element (e.g. lens, image sensor, mirror) to create the desired optical function. A commonly used actuator is based on voice coil motor (VCM) technology. In VCM technology, a permanent (or "fixed") magnet and a coil are used to create actuation force. The coil is positioned in the vicinity of the magnetic field of the fixed magnet. Upon driving current in the coil, a Lorentz force is created on the coil, an in return an equal counter-force is applied on the magnet. The magnet or the coil is rigidly attached to an optical element to construct an actuated assembly. The actuated assembly is then moved by the magnetic Lorenz force. Henceforth, in this description, a VCM will be referred to also as "VCM engine" and an actuator including such a VCM (or VCM engine) will be referred to as to as "VCM actuator" or simply "actuator".

In addition to the magnetic force, a mechanical rail is known to set the course of motion for the optical element. The mechanical rail keeps the motion of the lens in a desired path, as required by optical needs. A typical mechanical rail is known in the art as "spring-guided rail", in which a spring or set of springs is used to set the motion direction. A VCM that includes a spring-guided rail is referred to as a "spring-guided VCM". For example, U.S. patent application No. 20110235196 discloses a lens element shifted in a linear spring rail to create focus. For example, international patent application PCT/IB2016/052179 discloses the incorporation and use of a spring guided VCM in a folded camera structure ("FCS"—also referred to simply as "folded camera"). The disclosure teaches a lens element shifted to create focus and OIS and an optical path folding element (OPFE) shifted in a rotational manner to create OIS. Also, PCT/IB2016/052179 teaches AF+OIS in a folded actuator where the actuator dos not add to the module height.

Another typical mechanical rail is known in the art a "ball-guided rail", see e.g. U.S. Pat. No. 8,810,714. With a ball-guided rail, the lens is bound to move in the desired direction by set of balls confined in a groove (also referred to as "slit"). A VCM that includes a ball-guided rail is referred to as a "ball-guided VCM". A ball-guided VCM has several advantages over a spring-guided VCM. These include: (1) lower power consumption, because in a spring-guided VCM the magnetic force has to oppose a spring mechanical force, which does not exist in a ball-guided VCM, and (2) higher reliability in drops that may occur during the life-cycle of a camera that includes the VCM. The actuation method in U.S. Pat. No. 8,810,714 is designed for a standard non-folded lens, where the lens optical axis is directly pointed at the object to be photographed and cannot be used in a folded camera.

In view of the above, there is a need for, and it would be advantageous to have a linear ball guided VCM inside a folded camera to reduce the folded camera dimensions, in particular camera height and/or width. In addition, there is a need to show such a structure in a combination with various actuation mechanisms for the OPFEs in these cameras.

SUMMARY

Aspects of embodiments disclosed herein relate to VCMs to actuators including such VCMs, the actuators having linear ball-guided rails for AF and OIS in a folded camera, and to digital cameras, and in particular to cameras with folded optics that incorporate such VCMs.

In some exemplary embodiments there is provided an actuator for carrying and actuating a lens holder with a lens, the lens having a first optical axis, the lens receiving light folded from an optical path along a second optical axis that is substantially perpendicular to the first optical axis, the actuator comprising a first VCM engine coupled to the lens holder, a second VCM engine coupled to the lens holder, a first linear ball-guided rail operative to create a first movement of the lens holder upon actuation by the first VCM engine, wherein the first movement is in a first direction parallel to the first optical axis, and a second linear ball-guided rail operative to create a second movement of the lens holder upon actuation by the second VCM engine, wherein the second movement is in a second direction that is substantially perpendicular to the first optical axis and to the second optical axis.

In an exemplary embodiment, the first movement is for focus and the second movement is for OIS.

In an exemplary embodiment, an actuator further comprises a middle moving frame that includes at least one groove in the first direction and at least one groove in the second direction.

In an exemplary embodiment, the lens holder and the lens are made as one part.

In an exemplary embodiment, each of the first and second linear ball-guided rails includes a pair of grooves having at least one ball located therebetween.

In an exemplary embodiment, the first and second VCM engines include respective first and second VCM magnets.

In an exemplary embodiment, an actuator further comprises a static base, wherein the lens holder is movable only along the first direction with respect to the middle moving frame and wherein the middle moving frame is movable only along the second direction with respect to the static base.

In an exemplary embodiment, an actuator further comprises a static base, wherein the lens holder is movable only along the second direction with respect to the middle moving frame and wherein the middle moving frame is movable only along the first direction with respect to the static base.

In an exemplary embodiment, the first and second VCM magnets are fixedly attached to the lens holder.

In an exemplary embodiment, the first VCM magnet is fixedly attached to the lens holder and the second VCM magnet is fixedly attached to the moving frame.

In an exemplary embodiment, the first VCM magnet is fixedly attached to the moving frame, and the second VCM magnet is fixedly attached to the lens holder.

In an exemplary embodiment, the first VCM engine and the second VCM engine include respective first and second VCM coils mechanically coupled to the static base.

In an exemplary embodiment, an actuator further comprises at least one ferromagnetic yoke attached to the static base and used to pull the first VCM magnet in order to prevent both the first and the second linear ball-guided rail from coming apart.

In an exemplary embodiment, an actuator further comprises at least one ferromagnetic yoke attached to the static base and used to pull the first VCM magnet or the second VCM magnet in order to prevent both the first and the second linear ball-guided rail from coming apart.

In an exemplary embodiment, an actuator further comprises at least one ferromagnetic yoke attached to the static base and used to pull the second VCM magnet in order to prevent both the first and the second linear ball-guided rail from coming apart In an exemplary embodiment, the first and second VCM coils and the first and second VCM magnets are respectively separated by a constant distance.

In an exemplary embodiment, an actuator further comprises a first position sensor and a second position sensor for measuring a position of the lens upon the movement in the first and second directions, respectively.

In an exemplary embodiment, the first and second position sensors are Hall bar position sensors operative to measure the magnetic field of the first and the second VCM magnets, respectively.

In some exemplary embodiments, any of the actuators above may be included in a folded camera together with an OPFE that folds the light from the optical path along the second optical axis to an optical path along the first optical axis, wherein the OPFE is tiltable around the second direction by a spring based mechanism or a ball based mechanism.

In some exemplary embodiments, the folded camera is included together with an upright camera in a dual-aperture camera.

BRIEF DESCRIPTION OF THE DRAWINGS

Aspects, embodiments and features disclosed herein will become apparent from the following detailed description when considered in conjunction with the accompanying drawings, in which.

DETAILED DESCRIPTION

Figure 1A:
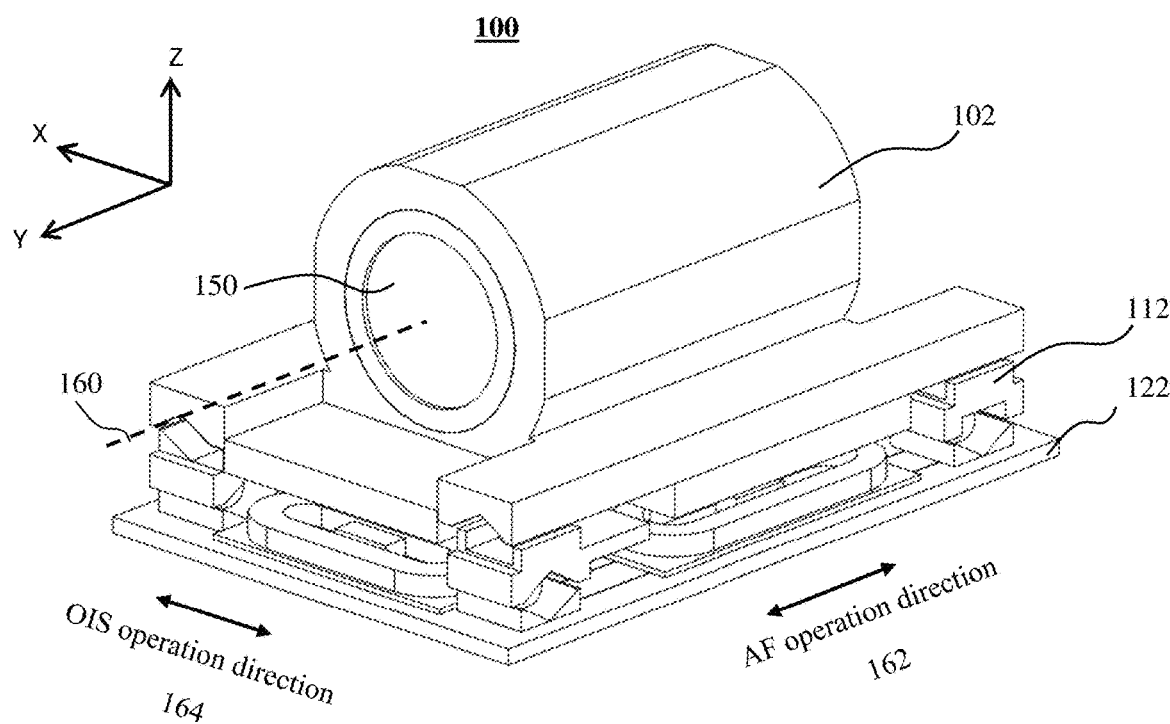
FIG. 1A shows an isometric view of a linear ball guided VCM actuator according to an exemplary embodiment disclosed herein.
Figure 1B:
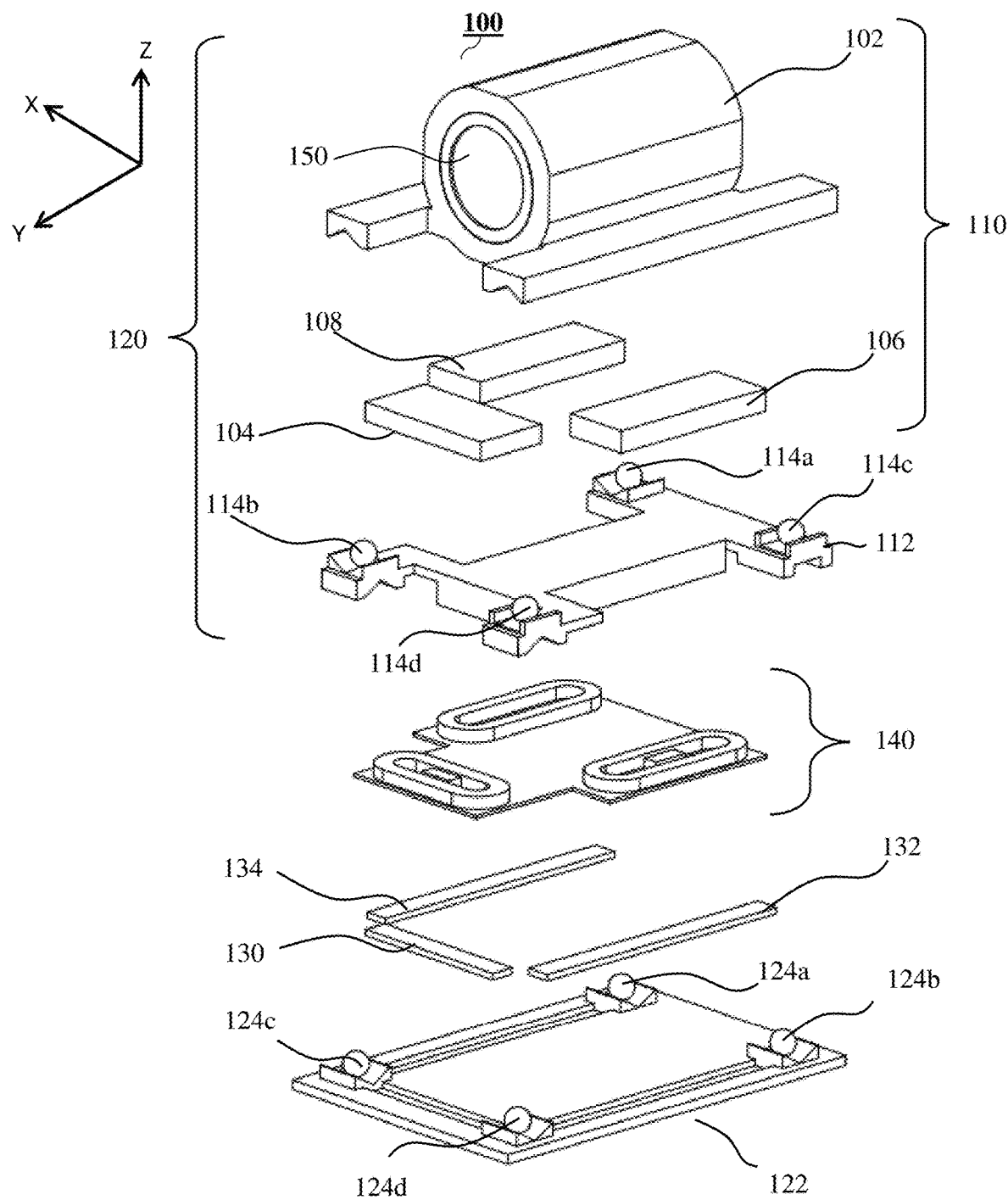
FIG. 1B shows the VCM actuator of FIG. 1A in an exploded view.

FIG. 1A shows an isometric view of a linear ball guided VCM actuator 100 according to an exemplary embodiment disclosed herein. FIG. 1B shows actuator 100 in an exploded view. Actuator 100 enables the shift of a lens 150 having an optical axis 160 (also referred to as "first optical axis") in two directions in a plane (i.e. the X-Y plane in the shown figures), as described below: AF operation in a direction 162 and OIS operation in a direction 164. Actuator 100 has exemplary length/width/height dimensions in the range of 3-40 mm, i.e. actuator 100 can be contained in a box with dimension of 3×3×3 $mm^3$ to 40×40×40 $mm^3$. The description continues with reference to a coordinate system XYZ shown in FIGS. 1A and 1B as well as in a number of other figures.

Figure 1C:
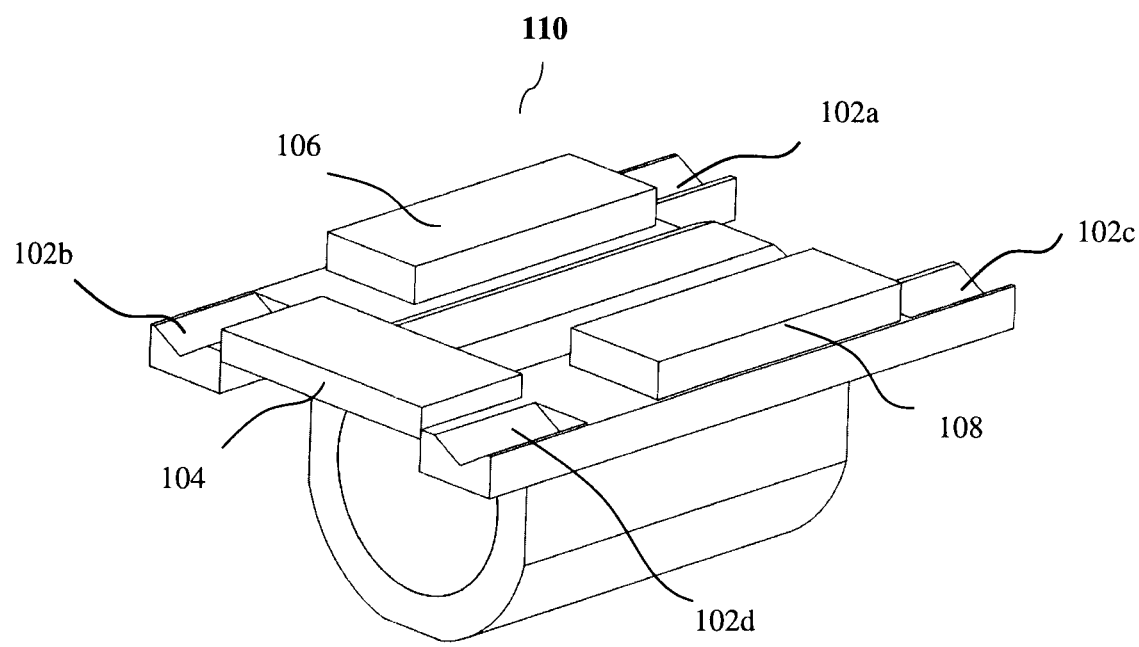
FIG. 1C shows a top actuated sub-assembly of the VCM actuator from a bottom view.

In actuator 100, lens 150 is positioned and held in a lens holder (or lens carrier) 102 that fits the shape of lens 150. In some embodiments, lens holder 102 and lens 150 may be a single part. In some embodiments, they may be separate parts. In the following description and claims, the term "lens holder" may be describing a lens holder only, or a unified part (component) that includes a lens holder and a lens. Lens holder 102 may be made, for example, by plastic molding, or alternatively by other methods. Three magnets 104, 106 and 108 are fixedly attached (e.g. glued) to lens holder 102 from below (in the negative Z direction in the figure). The assembly of lens holder 102 and magnets 104-108 will be referred to henceforth as "top actuated sub-assembly" 110. FIG. 1C shows top actuated sub-assembly 110 from a bottom view. Lens holder 102 includes four grooves, 102a-d. Grooves 102a-d are parallel to each other and are along the Y-axis. Grooves 102a-d are used to guide top actuated sub-assembly 110 along the Y direction.

Figure 1D:
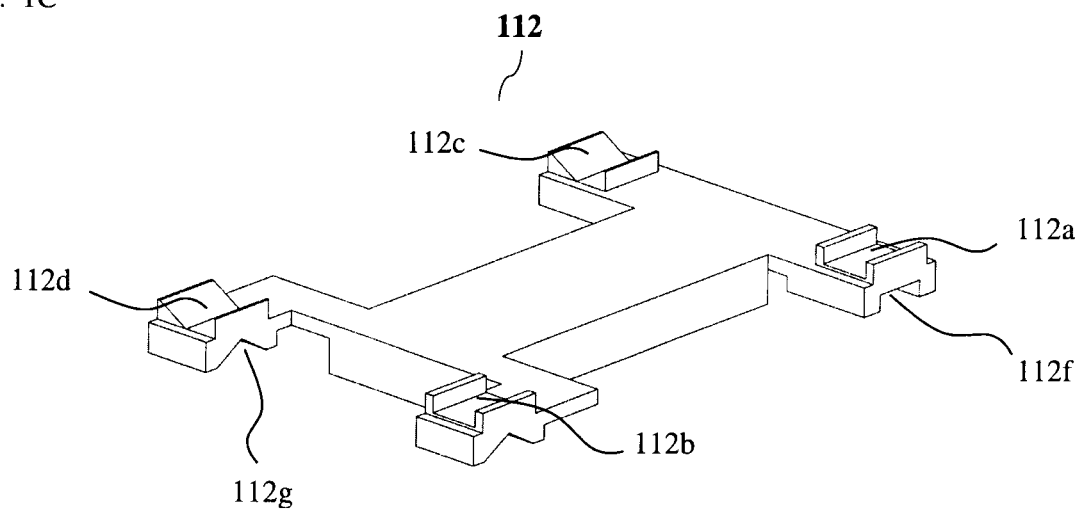
FIG. 1D shows a middle moving frame of the VCM actuator from a top view.
Figure 1E:
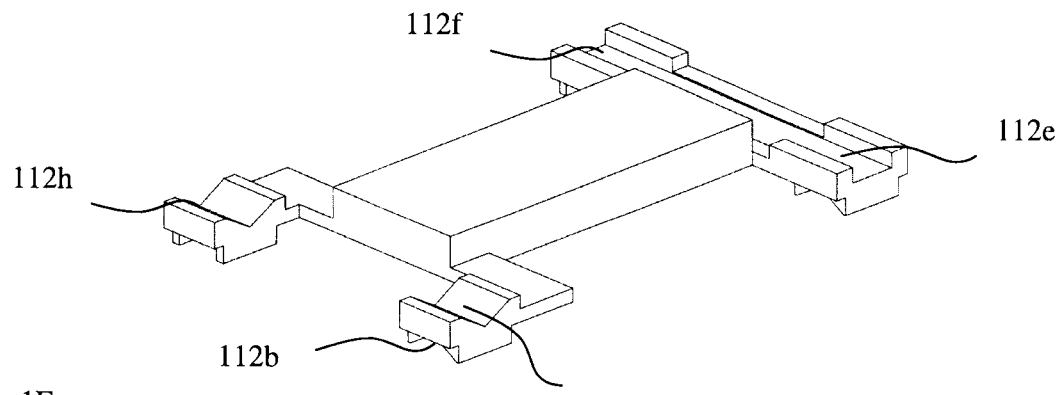
FIG. 1E shows a middle moving frame of the VCM actuator from a bottom view.

Actuator 100 further includes a middle moving frame 112, typically made of plastic. FIGS. 1D and 1E show middle moving frame 112 from top and bottom views, respectively.

Middle moving frame 112 includes eight grooves 112*a-h*, four grooves 112*a-d* on a top surface of adaptor 112 along the Y direction and four grooves 112*e-h* on a bottom surface of adaptor 112 are along the X direction. Top actuated sub-assembly 110 is positioned on top of middle moving frame 112 such that grooves 112*a-d* are just below and parallel to grooves 102*a-d*, respectively.

In the embodiment shown, four balls 114*a-d* are positioned on top of grooves 112*a-d* (one ball on top of each groove) such that balls 114*a-d* space apart lens holder 102 and middle moving frame 112 and prevent the two parts from touching each other. In other embodiments, actuator 100 may have more than one ball on top each groove 112*a-d*, for example up to 7 balls per groove. Balls 112*a-d* may be made from Alumina or another ceramic material, from a metal or from a plastic material. Typical ball diameters may be in the range of 0.3-1 mm. Other ball sizes and positioning considerations may be as in co-owned international PCT patent application PCT/IB2017/052383 titled "Rotational Ball Guided Voice Coil Motor".

Since lens holder 102 and middle moving frame 112 are exemplarily plastic molded, there is some tolerance allowed in part dimensions, typically a few tens of microns or less for each dimension. This tolerance may lead to misalignment of position between adjacent (facing) grooves 102*a*-102*b*-112*a*-112*b* and\or 102*c*-102*d*-112*c*-112*d*. To better align the grooves, grooves 102*a-d*, 112*a-b* may be V-shaped, i.e. have a V cross-section shape to ensure ball positioning, while grooves 112*c-d* may have a wider, rectangular cross-section. Grooves 102*a-b* and 112*a-b* are aligned during assembly, while the alignment of grooves 102*c-d* and 112*c-d* has a small freedom allowed by the rectangular cross section.

The assembly of top actuated sub-assembly 110, balls 114*a-d*, and middle moving frame 112 will be referred to henceforth as "bottom actuated sub-assembly" 120.

Figure 1F:
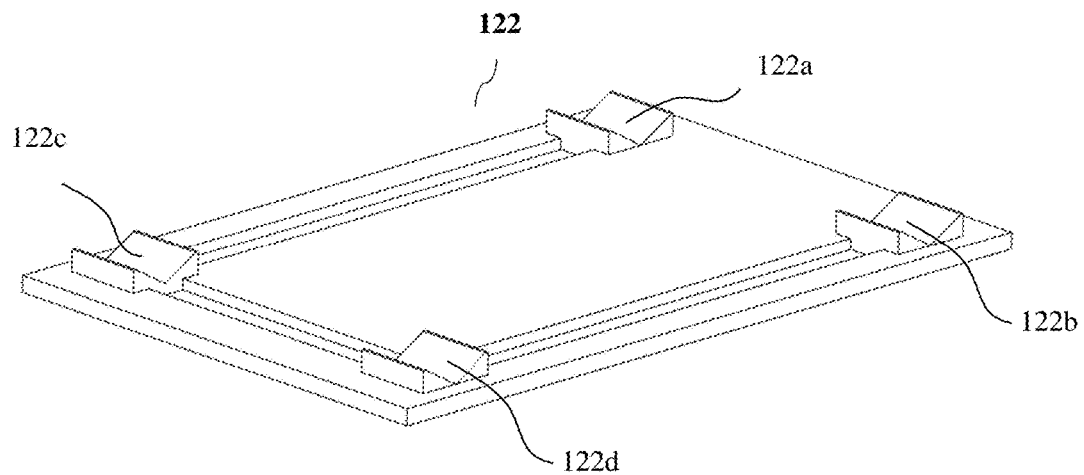
FIG. 1F shows a base of the VCM actuator in isometric view.

Actuator 100 further includes a base 122, typically made of plastic (FIG. 1B and FIG. 1F). Base 122 is molded with four grooves 122*a-d* along the X direction. Bottom actuated sub-assembly 120 is positioned on the top of base 122 such that grooves 122*a-d* are parallel to grooves 112*e-h* respectively. In the embodiment shown, base 122 only serves as part of actuator 100. In other embodiments, the base plastic molding may extend to serve for other purposes, such as a base for an actuator associated with a prism, to hold a camera sensor, to hold a shield, to prevent stray light and dust from reaching image sensor, etc.

Four balls 124*a-d* are positioned on top of grooves 122*a-d* (one ball on top of each groove) such that balls 124*a-d* space middle moving frame 112 apart from base 122 and prevent the two parts from touching each other. In other embodiments, actuator 100 may have more than one ball on top each groove 122*a-d*, for example up to 7 balls per groove. The size, material and other considerations related to balls 124*a-d* are similar to those of balls 114*a-d*.

Actuator 100 further includes three metallic ferromagnetic yokes 130, 132 and 134 fixedly attached (e.g. glued) to base 122 from above (positive Z direction in the figure) such each yoke is positioned below a respective one of magnets 104, 106 and 108. In other embodiments, ferromagnetic yokes 130, 132 and 134 may be fixedly attached to base 122 from below. Each yoke pulls its respective magnet by magnetic force in the negative Z direction, and thus all yokes prevent both top actuated sub-assembly 110 and bottom actuated sub-assembly 120 from detaching from base 122. Balls 114*a-d* prevent top actuated sub-assembly 110 from touching middle moving frame 112 and balls 124*a-d* prevent bottom actuated sub-assembly 120 from touching base 122.

Both top actuated sub-assembly 110 and bottom actuated sub-assembly 120 are thus confined along the Z-axis and do not move in positive or negative Z directions. The groove and ball structure further confines top actuated sub-assembly 110 to move only along the Y-axis and bottom actuated sub-assembly 120 to move only along the X-axis.

Figure 1G:
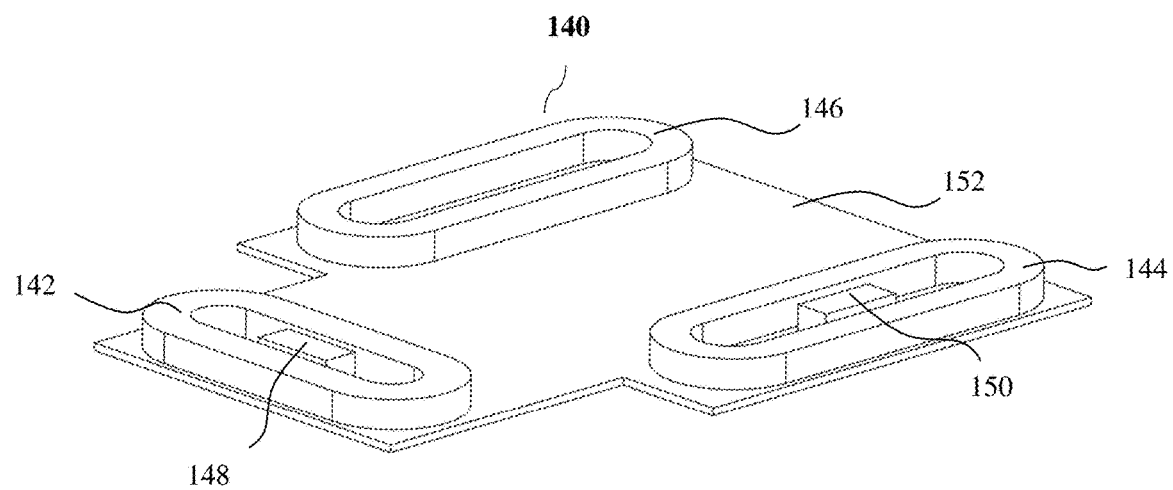
FIG. 1G shows an EM sub-assembly of the VCM actuator in isometric view.

Actuator 100 further includes an electro-magnetic (EM) sub-assembly 140, see FIG. 1B and FIG. 1G. EM sub-assembly 140 includes three coils 142, 144 and 146, two Hall bar elements 148 and 150 and a PCB 152. Coils 142-146 and Hall bar elements 148-150 are soldered (each one separately) to PCB 152. Coils 142-146 have exemplarily each a "stadium" shape and typically include a few tens of coil windings (i.e. in a non-limiting range of 50-250), with a typical resistance of 10-30 ohm. PCB 152 allows sending input and output currents to coils 142-146 and to Hall bar elements 148-126, the currents carrying both power and electronic signals needed for operation. PCB 152 may be connected electronically to the external camera by wires (not shown). EM sub-assembly 140 is positioned between magnets 104-108 and yokes 130-134, such that each coil 142-146 is positioned between a respective one of magnets 104-108 and a respective one of yokes 130-134. Upon driving a current in a coil (e.g. coil 142), a Lorentz force is created on the respective magnet (i.e. magnet 104); a current in a clockwise direction will create force in the positive Y direction, while a current in counter clockwise direction will create a force in the negative Y direction. Similarly, driving a current in coils 144 or 146 will create a respective Lorentz force on magnets 106 or 108; a current in a clockwise direction will create force in the positive X direction, while a current in a counter clockwise direction will create a force in the negative X direction. A full magnetic scheme (e.g. fixed magnets 130-134 pole direction) is described in detail for example in co-owned patent application PCT/IB2016/052179, and is known in the art.

Hall bar element 148 is positioned inside coil 142 and can sense the intensity and direction of magnetic field of magnet 102. Hall bar element 148 can thus measure the respective position of magnet 104 along the Y direction. Hall bar element 150 is positioned inside coil 144 and can sense the intensity and direction of magnetic field of magnet 106 and therefore measure the respective positon of magnet 106 along the X direction. Two Hall bar elements can thus sense the motion of top actuated sub-assembly 110 in the X-Y plane and can serve as position sensors for closed loop control, as known in the art and as described for example in detail in co-owned patent application PCT/IB2016/052179. Actuator 100 can thus serve to move lens 150 in the X-Y plane as needed by optical demands. The control circuit (not shown) may be implemented in an integrated circuit (IC). In some cases, the IC may be combined with Hall elements 148 and\or 150. In other cases, the IC may be a separate chip, which can be located outside of the camera (not shown).

It may be noted that all electrical connections needed by actuator 100 are to EM sub-assembly 140, which is stationary relative to base 122 and to the external world. As such there is no need to transfer any electrical current to any moving part.

Embodiment 100 describes a general two-direction actuator. Other embodiments may have variations as follows:

In embodiment 100, top actuated sub-assembly 110 moves in the Y direction relative to middle moving frame 112 and to base 122, while bottom actuated sub-assembly 120 moves in the X direction relative to base 122. In other actuator embodiments, such as in an actuator 100" shown in FIGS. 1J and 1K below, top actuated sub-assembly 110 may move in the X direction relative to middle moving frame 112 and to base 122, while bottom actuated sub-assembly 120 may move in the Y direction relative to base 122.

In embodiment 100, there are two VCMs providing force in the X direction. This is done to reduce power consumption. In other embodiments, an actuator may have only one VCM providing force in the Y direction.

In embodiment 100, there is one VCM providing force in the Y direction. This is done to reduce space. In other embodiments, an actuator may have more than one VCM in the X direction (for example two VCM).

In embodiment 100, magnets 106 and 108 are fixedly attached to lens carrier 102 as part of top actuated sub-assembly 110. Since magnets 106 and 108 provide force in the X direction and only need to move in the X direction relative to the base, in other embodiments magnets 106 and 108 may be fixedly attached to middle moving frame 112.

In some embodiments, actuator 100 may include parts not shown in figures. These may include: mechanical shield, electrical connectivity to the external world, driving IC, interface to connect to other camera parts, etc.

Figure 1H:
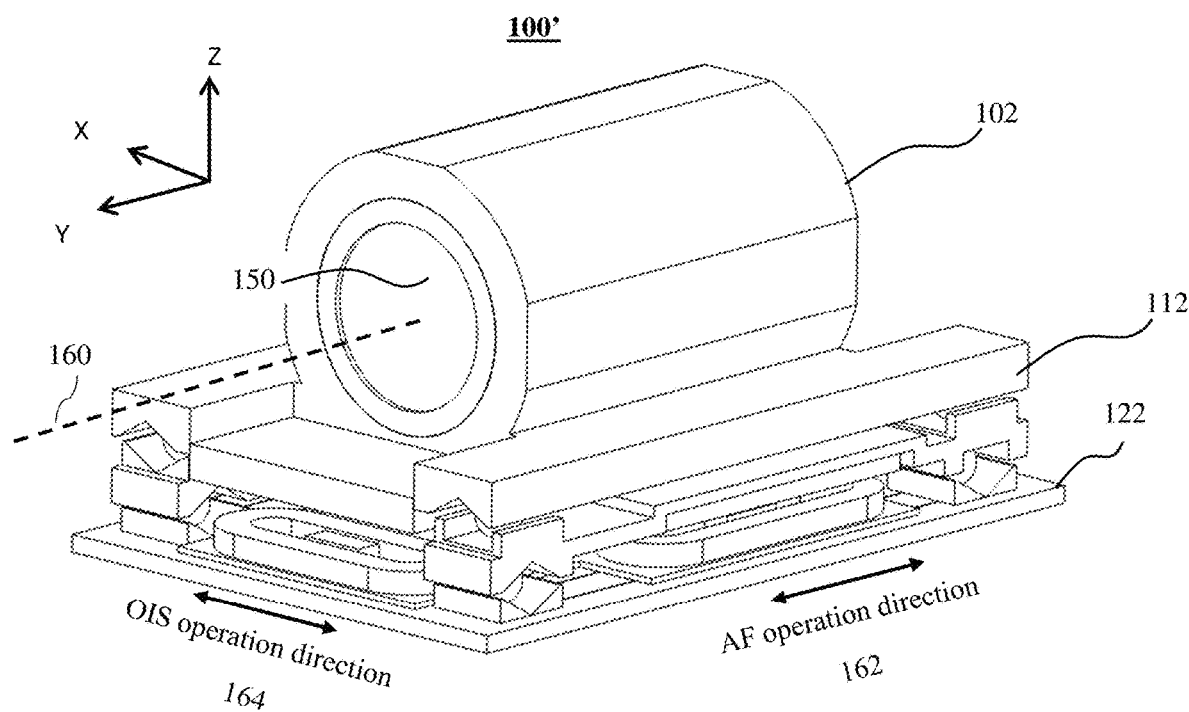
FIG. 1H shows an isometric view of a linear ball guided VCM actuator according to another exemplary embodiment.
Figure 1I:
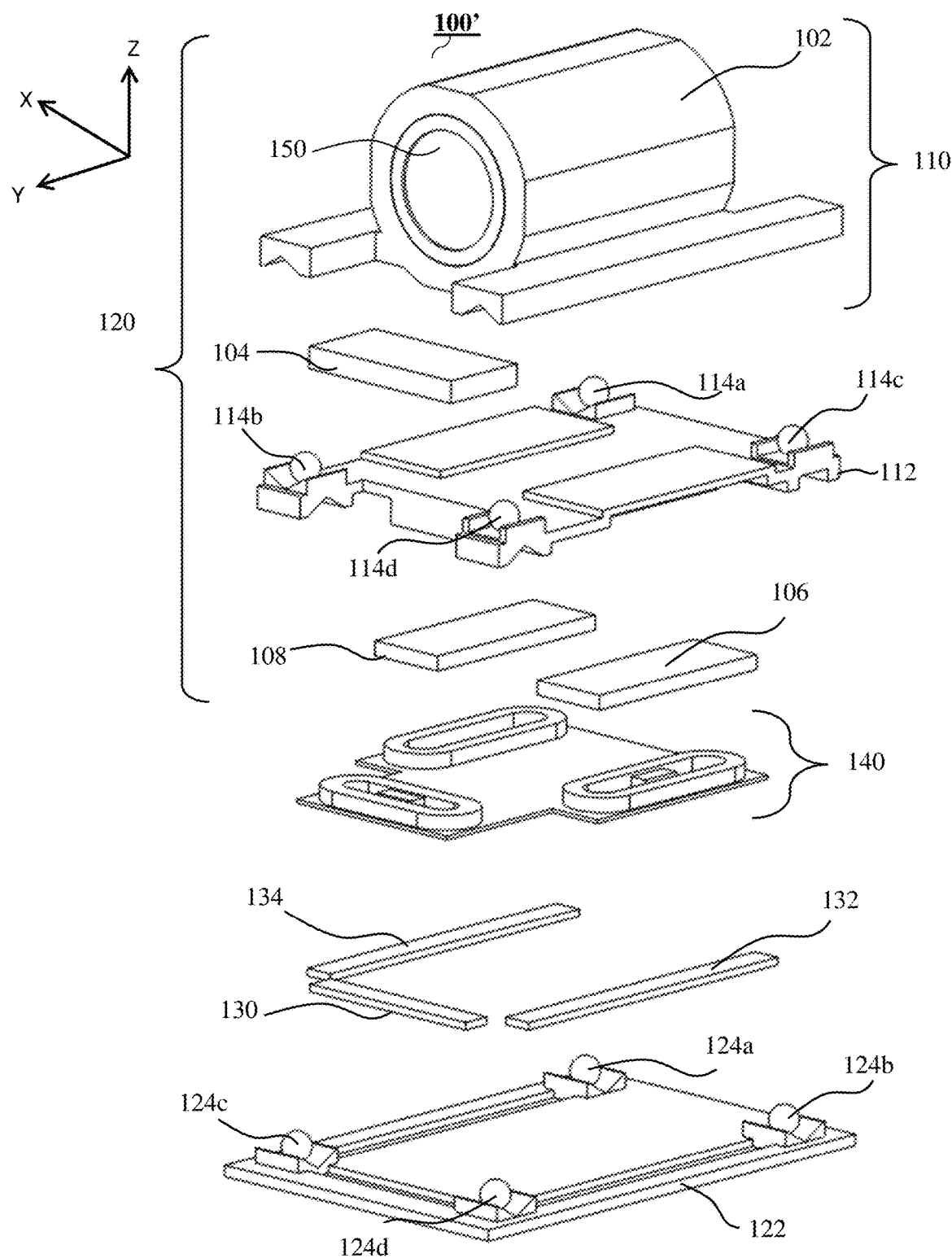
FIG. 1I shows the VCM actuator of FIG. 1H in an exploded view.

FIG. 1H shows an isometric view of a linear ball guided VCM actuator 100' according to another exemplary embodiment disclosed herein. FIG. 1I shows actuator 100' in an exploded view. Actuator 100' is similar to actuator 100 in structure (and therefore similar elements/components are not numbered and/or described) and function, except for a single difference: in actuator 100, magnets 106 and 108 are attached to lens carrier 102, while in actuator 100', magnets 106 and 108 are attached not to lens carrier 102 but to middle moving frame 112. Attaching magnets 106 and 108 to middle moving frame 112 allows full decoupling of the lens motion along the Y axis from magnets 106 and 108; namely, any motion of lens carrier 102 along the Y axis will not influence position reading by Hall sensor element 150.

Figure 1J:
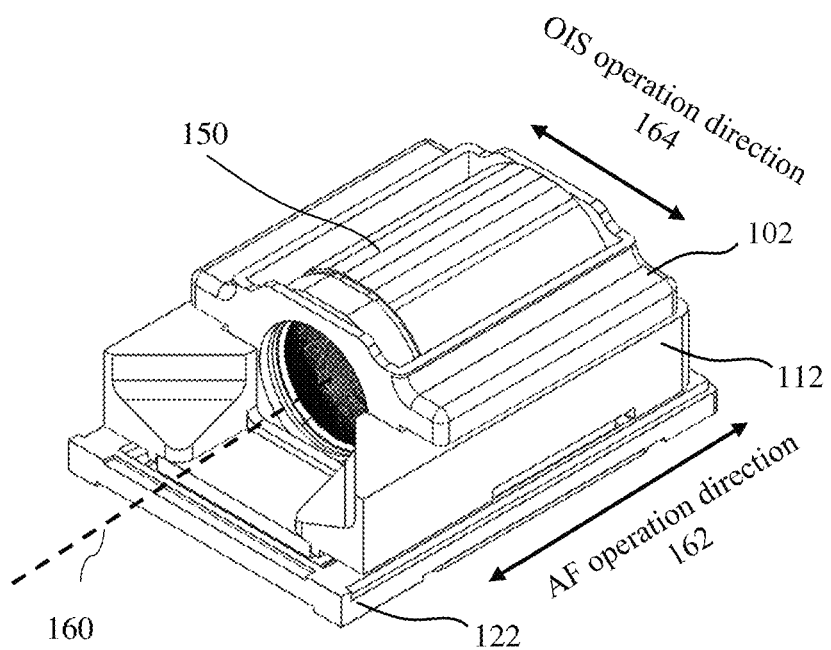
FIG. 1J shows an isometric view of a linear ball guided VCM actuator according to yet another exemplary embodiment.
Figure 1K:
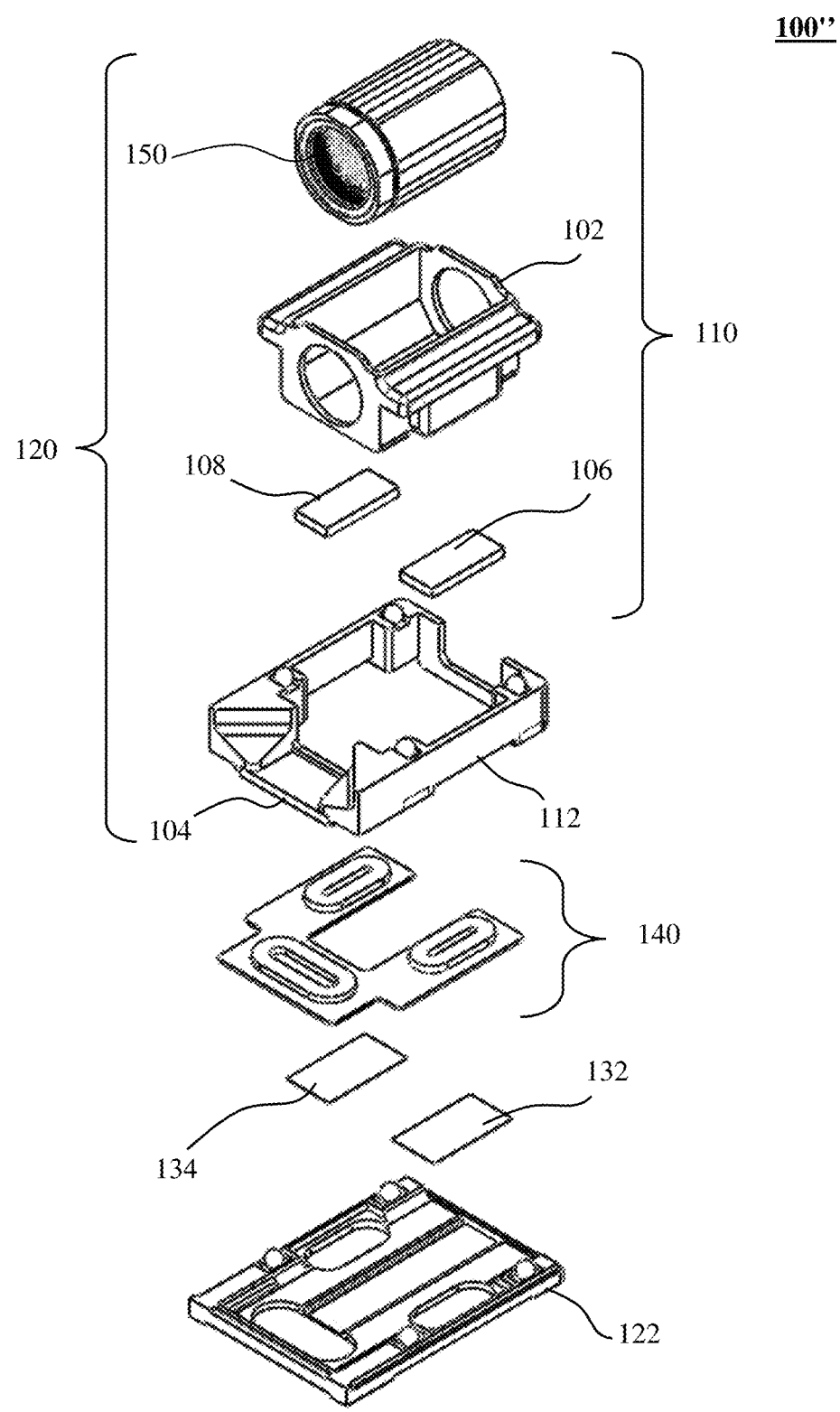
FIG. 1K shows the VCM actuator of FIG. 1J in an exploded view.

FIG. 1J shows an isometric view of a linear ball guided VCM actuator 100" according to yet another exemplary embodiment disclosed herein. FIG. 1K shows actuator 100" in an exploded view. Actuator 100" is similar to actuator 100 in structure (and therefore similar elements/components are not numbered and/or described) and function, except for the following differences:

a) In embodiment 100, top actuated sub-assembly 110 moves in the Y direction relative to middle moving frame 112 and to base 122, while bottom actuated sub-assembly 120 moves in the X direction relative to base 122. In embodiment 100", top actuated sub-assembly 110 may move in the X direction relative to middle moving frame 112 and to base 122, while bottom actuated sub-assembly 120 may move in the Y direction relative to base 122.

b) In actuator 100 magnet 104 is attached to lens carrier 102. In actuator 100", magnet 104 is attached to middle moving frame 112 and not to lens carrier 102. Attaching magnet 104 to middle moving frame 112 allows full decoupling of the lens motion along the X axis from magnet 104; namely, any motion of lens carrier 102 along the X axis will not influence position reading by Hall sensor element 148.

c) Actuator 100" is designed such that the total height along the Z axis is equal to the diameter of lens 150 plus a thickness t, where t may be about 500 µm. In actuator 100", the lens is inserted from the top. The insertion from the top allows to reduce the height of the actuator.

d) Yoke 130 is missing in actuator 100". Sufficient pull force is created by yokes 132 and 134 as described above. Yokes 132 and 134 pull magnets 106 and 108 respectively, and are holding both top actuated sub-assembly 110 and bottom actuated sub-assembly 120 from detaching from base 122. In other embodiments, a single yoke may be sufficient.

Figure 2A:
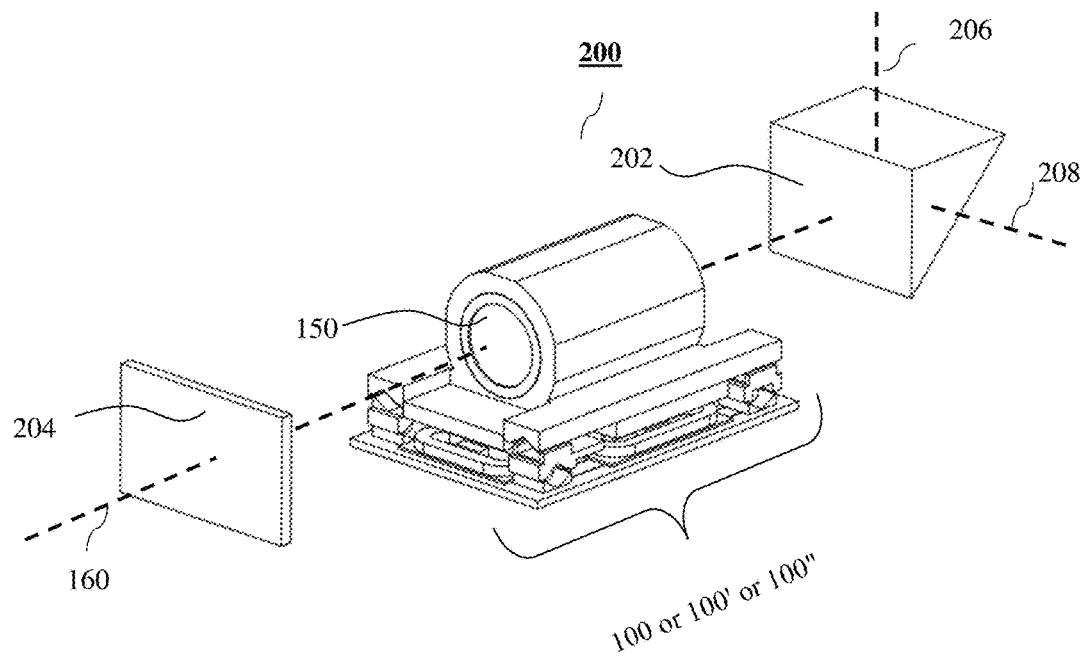
FIG. 2A shows an embodiment of a folded camera that includes an actuator disclosed herein.

FIG. 2A shows an actuator such as actuator 100, 100' or 100" included in a folded camera structure 200. For simplicity, the following description refers to actuator 100, with the understanding that it applies equally well to actuators 100' and 100". In FCS 200, actuator 100 serves exemplarily to move lens 150. Actuation of actuator 100 is done in FCS 200 to create autofocus AF (lens motion along X-axis) and OIS (lens motion along Y-axis) as described in co-owned PCT/IB2016/052179. FCS 200 further includes an OPFE 202 and an image sensor 204. OPFE 202 folds the light from a second optical axis 206 to first optical axis 160.

FCS 200 may further include other parts that are not displayed in FIG. 2A, such as a mechanical shield to protect the camera, stray light limiters, dust traps, IR filter(s), electrical circuitry for connection to external devices, control hardware, memory units (e.g. EEPROM), gyroscopes, etc. FCS 200 may further include an actuation mechanism for moving or tilting OPFE 202 for OIS around an axis 208, axis 208 being substantially perpendicular to both optical axis 160 and optical axis 206. Note that in FCS 200, magnet 104 and coil 142 are positioned between lens 150 and image sensor 204, a region known in the art as the "back focal length" (BFL) of lens 150.

Figure 2B:
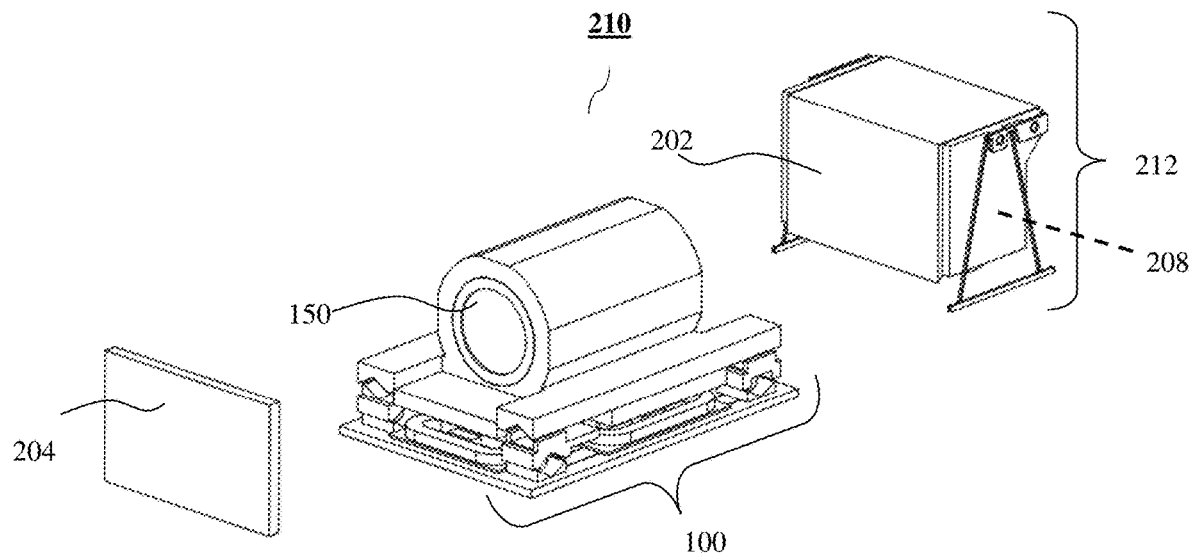
FIG. 2B shows an embodiment of a folded camera that includes an actuator disclosed herein and an OPFE rotated by one embodiment of a rotational spring based mechanism.

FIG. 2B shows an embodiment numbered 210 of another FCS that includes an actuator such as actuator 100, 100' or 100". In FCS 210, OPFE 202 is tiltable by a first embodiment of a rotational spring based mechanism numbered 212. Exemplarily, the mechanism may be based on a VCM. A full description of a rotational spring based VCM, with explanation of its method of operation, is provided in co-owned patent PCT/IB2016/052179. In FCS 210, actuator 100 and VCM 212 are physically separate; in other embodiments, they may be connected or share parts, for example, by having a single unified plastic base.

Figure 2C:
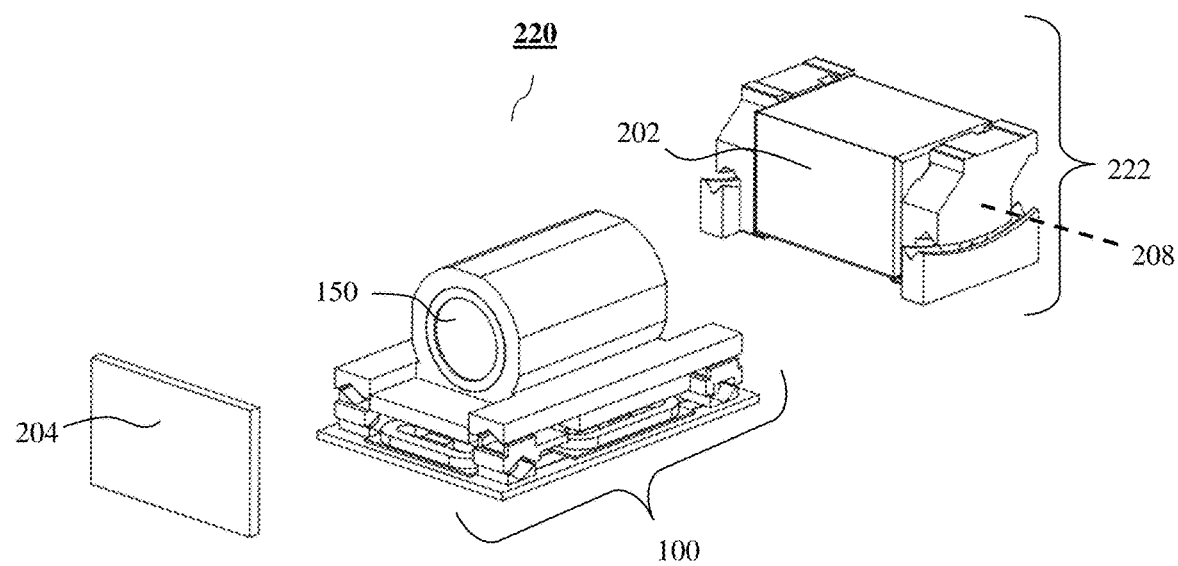
FIG. 2C shows an embodiment of a folded camera that includes an actuator disclosed herein and an OPFE rotated by another embodiment of a rotational ball based mechanism.

FIG. 2C shows an embodiment numbered 220 of yet another FCS that includes an actuator such as actuators 100 or 100' or 100". In FCS 220, OPFE 202 is tiltable (rotatable) by a second embodiment of a rotational ball based mechanism numbered 222. Exemplarily, the mechanism may be based on a VCM. A full description of a rotational ball guided VCM 222, with explanation of the method of operation, is provided in PCT IB2017/052383. In FCS 220, actuator 100 and VCM 222 are physically separate; in other embodiments, they may be connected or share parts, for example, by having a single unified plastic base.

Figure 3:
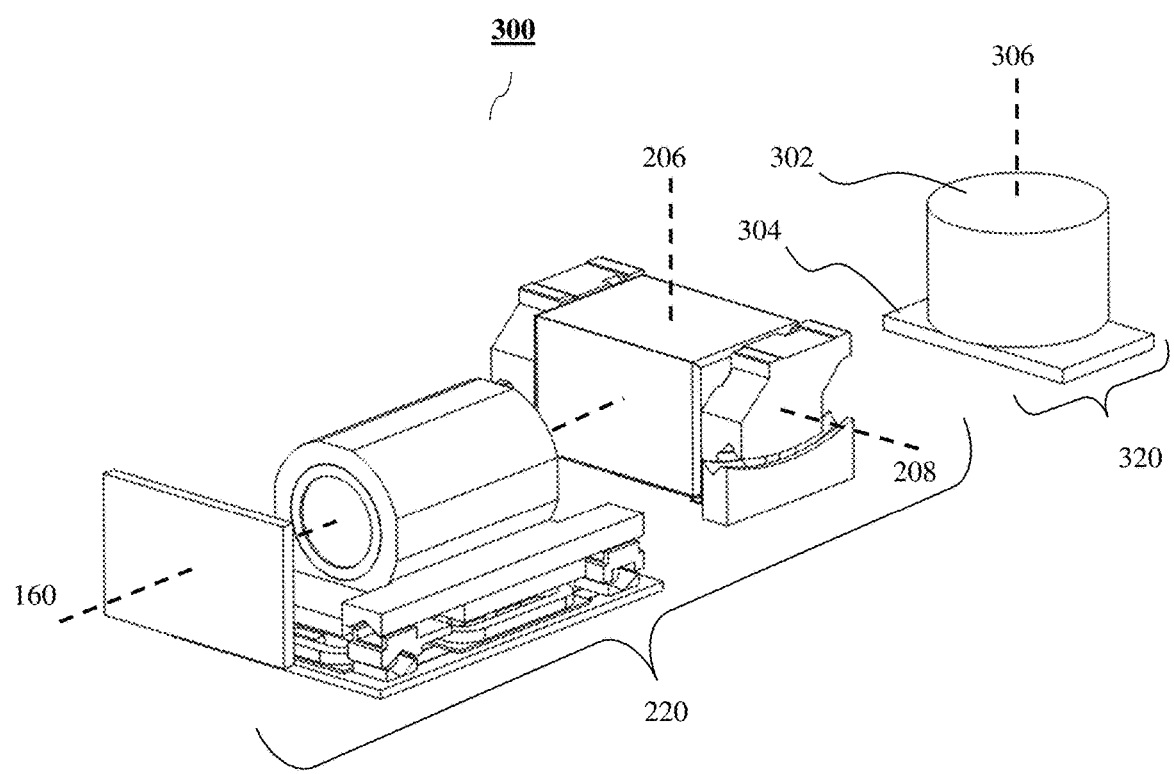
FIG. 3 shows an embodiment of a dual-camera that includes a folded camera as in FIG. 2C together with a non-folded (up right) camera.

FIG. 3 shows an exemplary embodiment numbered 300 of a dual-aperture camera (dual-camera) that comprises a FCS such as FCS 200, 210 or 220 and a non-folded (upright) camera 320. In the exemplary embodiment shown, the FCS is similar to FCS 220, but it should be understood that the FCS can be any other FCS disclosed herein. Upright camera 320 includes a lens 302 and an image sensor 304. Lens 302 has an optical axis 306 that is substantially parallel to second optical axis 206. Upright camera 320 may include other parts (not shown), such as an actuation mechanism for lens 302, a shield, electrical circuitry, etc. The usage and operation of a dual-camera structure is described for example in co-owned U.S. Pat. No. 9,392,188.

Any of the actuators disclosed above may be included in a folded camera, which folded camera may be included together with an upright (non-folded) camera in a dual-aperture camera with folded lens, for example as described in co-owned U.S. Pat. No. 9,392,188.

While this disclosure describes a limited number of embodiments, it will be appreciated that many variations, modifications and other applications of such embodiments may be made. In general, the disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A folded camera, comprising:
   a lens having a lens diameter $D_L$ and a lens optical axis, the lens held in and fixedly coupled to a lens holder;
   an optical path folding element (OPFE) that folds light from a first optical path to a second optical path perpendicular to the first optical path, wherein the second optical path is parallel to the lens optical axis;
   an image sensor; and
   a first actuator that includes a first motor for linearly actuating the lens holder along a first direction, and a second actuator for rotationally actuating the OPFE along a second direction perpendicular to the first direction,
   wherein the first actuator has a height $H_A$ measured along a direction parallel to the first optical path, and wherein $H_A \leq D_L + 0.5$ mm.

2. The folded camera of claim 1, wherein the first actuator further includes a second motor for linearly actuating the lens holder along the second direction.

3. The folded camera of claim 1, wherein the second actuator includes a rotational spring-based mechanism.

4. The folded camera of claim 1, wherein the second actuator includes a rotational ball-based mechanism.

5. The folded camera of claim 1, wherein the actuator has length and/or width and/or height dimensions in the range of 3-40 mm.

6. The folded camera of claim 1, wherein the first direction is parallel to the lens optical axis.

7. The folded camera of claim 1, wherein the first actuator further comprises a middle moving frame that includes at least one groove in the first direction and at least one groove in the second direction.

8. The folded camera of claim 2, wherein the first actuator includes a first linear ball-guided rail operative to guide the actuation along the first direction, and wherein the second actuator includes a second linear ball-guided rail operative to guide the actuation along the second direction.

9. The folded camera of claim 2, wherein the actuation along the first direction is for focus and wherein the actuation along the second direction is for optical image stabilization.

10. The folded camera of claim 2, wherein the first actuator further comprises a first position sensor and a second position sensor for measuring a position of the lens upon the movement in the first and second directions, respectively.

11. The folded camera of claim 7, wherein the first actuator further comprises a static base, wherein the lens holder is movable only along the first direction with respect to the middle moving frame, and wherein the middle moving frame is movable only along the second direction with respect to the static base.

12. The folded camera of claim 7, wherein the first actuator further comprises a static base, wherein the lens holder is movable only along the second direction with respect to the middle moving frame and wherein the middle moving frame is movable only along the first direction with respect to the static base.

13. The folded camera of claim 7, wherein the first motor includes a first magnet, and wherein the second motor includes a second magnet.

14. The folded camera of claim 8, wherein each of the first linear ball-guided rail and the second linear ball-guided rail includes a pair of grooves having at least one ball located therebetween.

15. The folded camera of claim 11, wherein the first motor includes a first coil, wherein the second motor includes a second coil, and wherein the first coil and the second coil are mechanically coupled to the static base.

16. The folded camera of claim 13, wherein the first and second magnets are fixedly attached to the lens.

17. The folded camera of claim 13, wherein the first magnet is fixedly attached to the lens and wherein the second magnet is fixedly attached to the middle moving frame.

18. The folded camera of claim 13, wherein the first magnet is fixedly attached to the middle moving frame, and wherein the second magnet is fixedly attached to the lens.

19. The folded camera of claim 1, included in a mobile device.

20. The folded camera of claim 19, wherein the mobile device is a smartphone.

\* \* \* \* \*